US000001879H

United States Statutory Invention Registration [19]

[11] Reg. Number: H1,879

Spriester et al.

[45] Published: Oct. 3, 2000

[54] SIGNAL EQUALIZER CIRCUIT FOR CABLE TAP

[75] Inventors: Bart F. Spriester, Duluth; Robert S. Collmus, Alpharetta; Robert C. Loveless, Jr., Lawrenceville, all of Ga.

[73] Assignee: Scientific-Atlanta, Inc., Norcross, Ga.

[21] Appl. No.: 09/035,957

[22] Filed: Mar. 6, 1998

[51] Int. Cl.[7] ..... H04N 7/10

[52] U.S. Cl. ..... 348/12; 455/5.1

[56] References Cited

U.S. PATENT DOCUMENTS

| | | | |
|---|---|---|---|
| 3,764,914 | 10/1973 | Karnaugh . | |
| 4,222,066 | 9/1980 | Zelenz . | |
| 4,354,167 | 10/1982 | Terreault et al. . | |
| 4,484,218 | 11/1984 | Boland et al. . | |
| 4,530,008 | 7/1985 | McVoy . | |
| 4,578,702 | 3/1986 | Campbell, III . | |
| 4,755,776 | 7/1988 | Preschutti . | |
| 4,928,272 | 5/1990 | Ohue . | |
| 4,963,966 | 10/1990 | Harney et al. . | |
| 4,982,440 | 1/1991 | Dufresne et al. | 348/12 |
| 5,045,823 | 9/1991 | Michols, III . | |
| 5,144,267 | 9/1992 | West, Jr. . | |
| 5,194,947 | 3/1993 | Lowcock et al. . | |
| 5,281,933 | 1/1994 | Chamberlin . | |
| 5,317,392 | 5/1994 | Ishibashi . | |
| 5,345,504 | 9/1994 | West, Jr. . | |
| 5,390,337 | 2/1995 | Jelinek et al. . | |
| 5,434,610 | 7/1995 | Loveless . | |
| 5,461,349 | 10/1995 | Simons . | |
| 5,485,630 | 1/1996 | Lee et al. . | |
| 5,505,901 | 4/1996 | Harney et al. . | |
| 5,557,319 | 9/1996 | Gurusami et al. . | |
| 5,738,525 | 4/1998 | Davies . | |
| 5,745,159 | 4/1998 | Wax et al. | 348/8 |
| 5,745,838 | 4/1998 | Tressness et al. . | |
| 5,819,159 | 10/1998 | Dail . | |
| 5,835,844 | 11/1998 | Stoneback et al. . | |
| 5,845,191 | 12/1998 | Morgan . | |

*Primary Examiner*—Daniel T. Pihulic

*Attorney, Agent, or Firm*—Kenneth M. Massaroni; Kelly A. Gardner; Hubert J. Barnhardt, III

[57] ABSTRACT

A cable television system (100) includes a head end section (105) for generating a cable signal; a communication medium (110, 117), such as fiber optic cable and coaxial cable, coupled to the head end section (105) for routing the cable signal through the cable television system (100), and cable taps (200) coupled to the communication medium (110, 117) for receiving the cable signal and providing subscriber drops to subscribers of the cable television system (100). As the cable signal is routed through the system (100), the signal levels of the signal decrease, and higher frequencies are attenuated more rapidly than are lower frequencies of the signal. Therefore, taps (200) of the cable television system (100) include equalizer circuits (212) for attenuating lower frequencies of the cable signal to provide relatively flat signal levels at the subscriber drops. The equalizer circuits (212) also conveniently attenuate reverse signals, as necessary, so that relatively equivalent reverse signal levels are seen by the headend section (105).

17 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SIGNAL EQUALIZER CIRCUIT FOR CABLE TAP

FIELD OF THE INVENTION

This inventions relates generally to cable television systems, and more specifically to cable taps used in such systems.

BACKGROUND OF THE INVENTION

Cable television systems typically include a head end section that receives satellite signals and demodulates the signals to baseband. The baseband signal is then converted to an optical signal for transmission from the head end section, such as over fiber optic cable. Cable systems also include one or more nodes for converting optical signals to a radio frequency (RF) signal for further transmission along branches of the system that can include coaxial cable rather than fiber optic cable. Taps are situated along the coaxial cable to tap off signals to subscriber premises.

As the cable signal is routed farther from the head end section, the signal is attenuated, and signal levels of higher frequencies are attenuated more rapidly than signal levels of lower frequencies. Amplifiers within the cable television system are used to compensate for attenuation of the signal levels. However, even after amplification, the higher frequencies are at lower levels than the lower frequencies. These uneven, attenuated signal levels are also seen at the subscriber premises since the cable taps merely pass the incoming signal along to subscriber drops. As a result, the higher frequency signals in particular may have levels that are low enough to cause erroneous operation of subscriber equipment.

Thus, what is needed is a way to compensate for attenuated higher frequency signals in a cable television system.

DETAILED DESCRIPTION OF A PREFERRED EMBODIMENT

Figure 1:
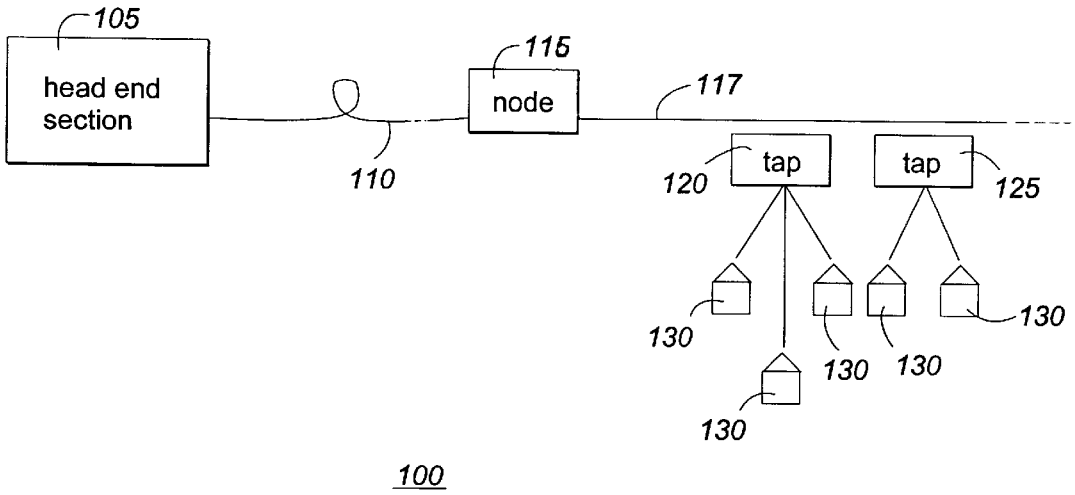
(PRIOR ART) FIG. 1
FIG. 1 is an illustration of a conventional cable television system.

Referring to FIG. 1, a cable television system 100 is shown. The system 100 includes a head end section 105 for receiving satellite television signals, demodulating the signals down to baseband, and transmitting the signals over the system 100. The transmitted signals can, for instance, be radio frequency (RF) signals, although they are more preferably optical signals that are transmitted over a communication medium such as fiber optic cable 110. When optical signals are transmitted by the head end section 105, one or more nodes 115 are included in the system 100 for converting the optical signals to RF signals that are thereafter routed over other media, such as coaxial cables 117. Taps 120, 125 are provided within the cable system 100 for splitting the RF signal off to system subscribers 130. Each tap can include various numbers of outgoing ports, depending upon the number of system subscribers 130 to be coupled to the tap 120, 125. For example, when eight system subscribers are to receive service via a particular tap, the tap includes eight outgoing subscriber ports, as well as a main outgoing port for forwarding the cable signal throughout the cable television system 100.

Figure 2:
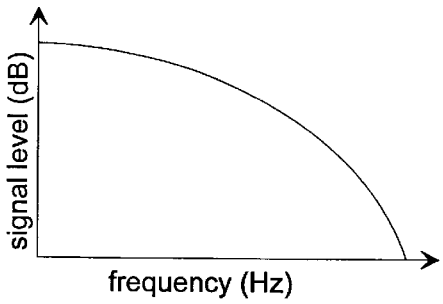
(PRIOR ART) FIG. 2
FIG. 2 is a signal diagram of the signal level of a radio frequency signal as it is distributed by taps within the conventional cable television system of FIG. 1.

As the cable signal is routed through the cable system 100, the signal levels decrease as a result of losses within the communication medium and as a result of taps within the system 100 that split the signal off to various subscribers. Amplifiers (not shown) are provided within the system 100 for amplifying the signal at different areas of the cable television system 100 to compensate for these decreased signal levels. Losses along the communication paths, however, result in greater attenuation of the higher frequencies than of the lower frequencies, as shown in FIG. 2. Therefore, even after amplification, signal levels are lower at the higher frequencies than at the lower frequencies. More rapid attenuation of the higher frequencies of the cable signal can create problems, such as erroneous processing of higher frequency signals by subscriber equipment, e.g., televisions.

Reverse signals, i.e., signals from subscriber equipment back to the headend section 105, may also be processed by the cable system 100. The reverse signals are usually in the frequency range unused by forward signals, i.e., signals from the headend section 105 to the subscribers. For example, forward signals can be transmitted using spectrum in the range of 51 MHz to 750 MHz, while reverse signals from, e.g., cable modems and set top units are transmitted using lower frequencies, e.g., 5 MHz to 40 MHz. When the cable system 100 permits reverse communications, it is usually desirable that reverse signals be transmitted at relatively high signal levels so that the signal-to-noise ratios at the taps 120, 125 are as great as possible. However, disparities in reverse signal levels as well as extremely high reverse signal levels can create problems at the headend section 105.

Figure 3:
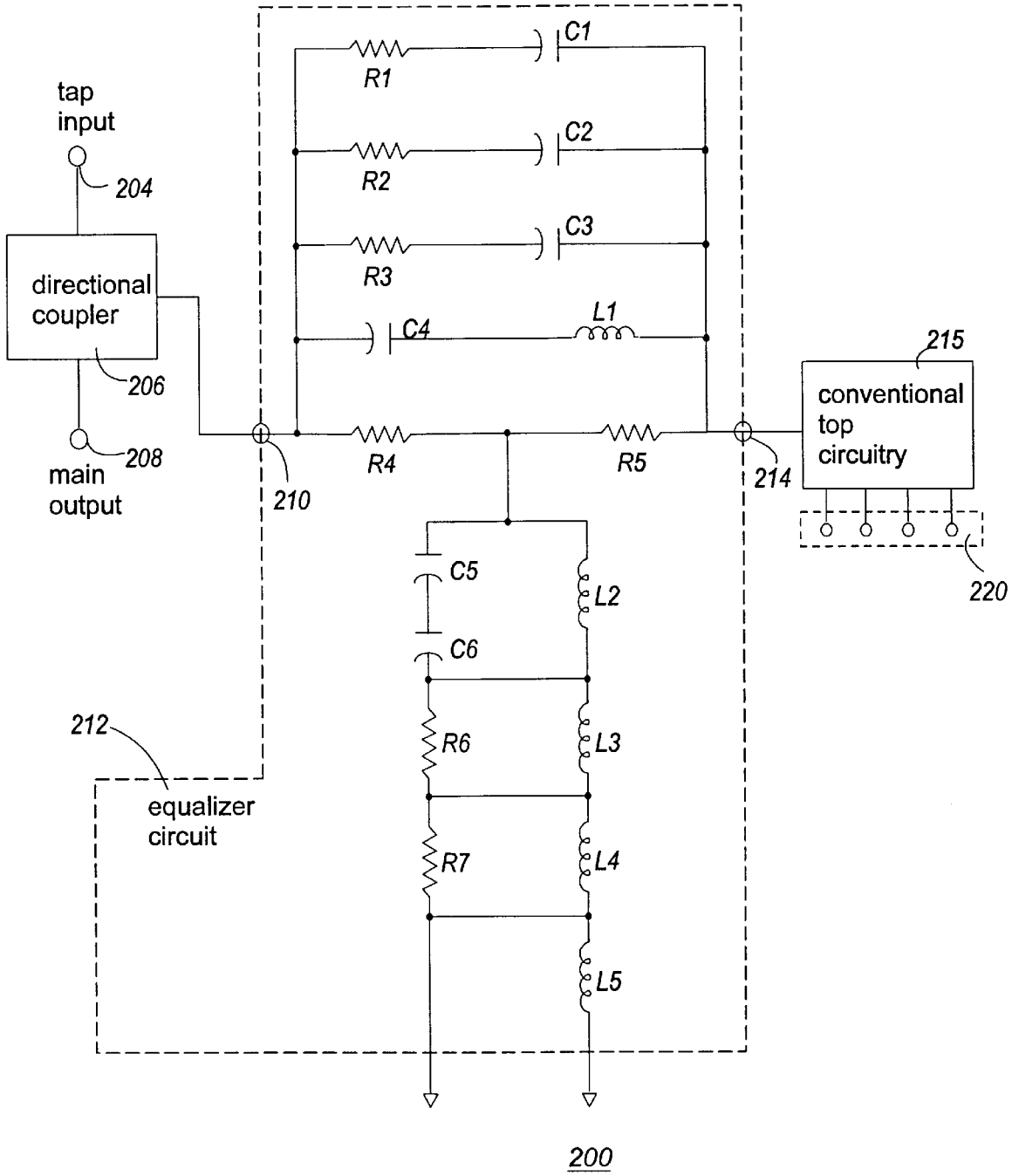
FIG. 3 is a diagram of a cable tap including an equalizer circuit in accordance with the present invention.

Referring next to FIG. 3, a circuit diagram of a tap 200 according to the present invention is shown. The tap 200, like conventional taps, includes a tap input 204 coupled to a directional coupler 206 for splitting off the cable signal to provide a portion thereof to other tap circuitry and forwarding the remainder of the signal, via a main output 208, to other cable equipment. The amount of the signal that is split off by the tap 200 is given by a value, e.g., 10 decibels (dB), associated with the tap 200. When, for instance, the tap 200 is a 10 dB tap, a 10 dB signal is provided to the tap circuitry by the directional coupler 206, and the cable signal, having a signal level decreased by 10 dB, is provided at the main output 208. The signal levels of the signal provided to the tap circuitry are proportional to those of the incoming cable signal. In other words, if signal levels of the cable signal at the tap input 204 fall off at higher frequencies, so will the signal levels of the signal provided to the tap circuitry by the directional coupler 206.

The tap 200 further includes an equalizer circuit 212 having an input 210 coupled to the directional coupler 206. According to the present invention, the equalizer circuit 212 processes the received cable signal to attenuate lower frequencies of the signal, thereby flattening the signal level with respect to frequency. In essence, the equalizer circuit 212 functions as a high pass filter so that levels roll off as the frequency decreases. As a result, a cable signal having a relatively flat signal level can be provided at the equalizer circuit output 214, which is coupled to conventional tap circuitry 215 for generating signals at subscriber outputs 220. Subscriber equipment is then conveniently provided with relatively uniform signal levels across frequency, resulting in more reliable processing of the cable signal.

The tap 200 according to the present invention further provides benefits in the reverse path direction. As mentioned briefly hereinabove, a reverse signal from subscriber equipment is preferably sent at the high end of the equipment's dynamic range to achieve high signal-to-noise ratios, thereby minimizing the effects of noisy communication media coupled between the tap 200 and the subscriber equipment. The reverse signal, when present, is provided to the tap 200 and routed back through the cable system to the headend section. Usually, the reverse signal travels over the same communication media as the forward signal, although the reverse signal is typically lower in frequency. More specifically, the reverse signal travels to the tap 200 and is processed by the equalizer circuit 212, then transmitted back to the head end section via the tap "input" 204. Since the equalizer circuit 212 attenuates lower frequencies more than higher frequencies, the reverse signal in particular is attenuated, as the reverse signal is typically in the 5 MHz to 40 MHz range. As a result, the headend section is not hit with extremely high level reverse signals that can cause processing errors at the headend section.

Preferably, reverse signals from different subscriber sources arrive back at the headend section at approximately equivalent signal levels so that all reverse signals can be reliably detected. Therefore, different equalizer circuits having different amounts of attenuated can be provided as necessary, such as in the form of removable modules that can be easily changed out within the taps. The following example may provide clarification of this process.

EXAMPLE

A simplified cable system includes subscribers, two of which are coupled to a first tap and two of which are coupled to a second tap. Reverse signals received by the headend are preferably all at approximately 20 dB. Reverse path losses from the first tap to the headend section are about 10 dB, and reverse path losses from the second tap to the headend section are approximately 18 dB. Reverse path losses from the first tap to the subscriber equipment coupled thereto are approximately 3 dB, and reverse path losses from the second tap to the associated subscriber equipment are about 5 dB. If the high end of the dynamic range of the subscriber equipment is approximately 45 dB, the subscriber equipment can be conveniently operated at this level if the equalizer circuit included in the first tap attenuates the reverse signal by about 32 dB, and the equalizer circuit included in the second tap attenuates the reverse signal by about 22 dB.

The following table sets forth values of components that can be used to implement the equalizer circuit 212. It will be appreciated, however, that other values and other circuit topologies can alternatively be used to provide a function similar to that of the equalizer circuit 212 shown in FIG. 3, and that other values will be needed to change levels of attenuation provided by different equalizer modules.

TABLE 1

| Component Values | |
|---|---|
| R1 | 68 ohms |
| R2 | 180 ohms |
| R3 | 56 ohms |

TABLE 1-continued

| Component Values | |
|---|---|
| R4 | 75 ohms |
| R5 | 75 ohms |
| R6 | 82 ohms |
| R7 | 30 ohms |
| L1 | approximately zero (such as piece of wire) |
| L2 | 5 turns |
| L3 | 39 microHenries |
| L4 | 47 nanoHenries |
| L5 | 18 nanoHenries |
| C1 | 30 picoFarads |
| C2 | 82 picoFarads |
| C3 | 680 picoFarads |
| C4 | 4.5–20 picoFarads |
| C5 | 15 picoFarads |
| C6 | 15 picoFarads |

Figure 4:
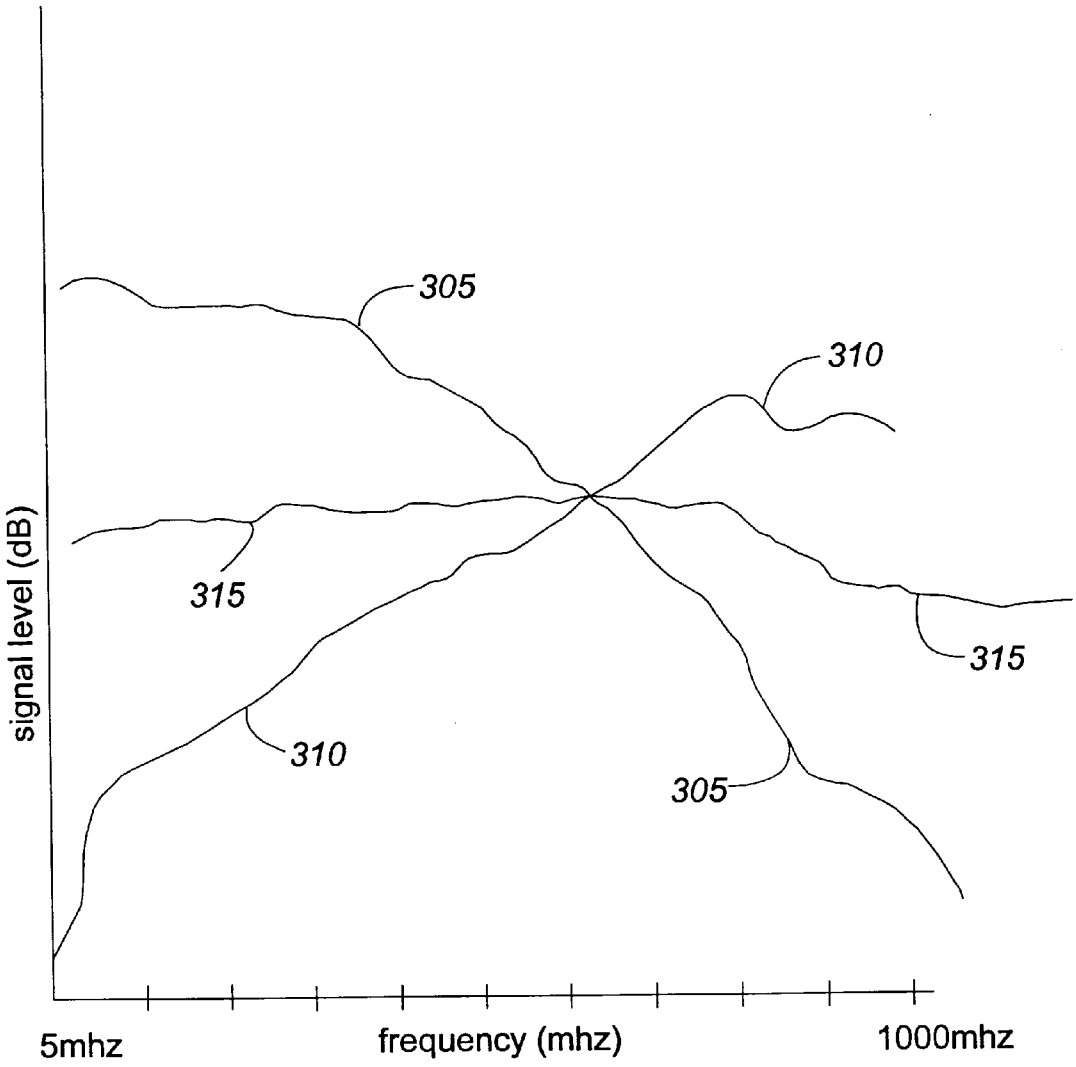
FIG. 4 is a signal diagram depicting adjustment of signal levels by the equalizer circuit of FIG. 3 in accordance with the present invention.

FIG. 4 is a signal diagram depicting a cable signal 305 at the input 210 of the equalizer circuit 212 of the tap 200, the frequency response 310 of the equalizer circuit 212, and the cable signal 315 at the output 214 of the equalizer circuit 212. As mentioned above, routing of the cable signal 305 attenuates the signal, especially at higher frequencies, resulting in a signal level that rolls off at higher frequencies. When processed by the equalizer circuit 212, the lower frequencies of the cable signal 305 are attenuated. The resulting signal 315 is relatively flat across both the lower and higher frequencies. It will be appreciated that, if necessary, an amplifier (not shown) can be utilized to compensate for the attenuation introduced by the equalizer circuit 212 of the tap 200.

In summary, the cable television system described above includes a head end section for generating a cable signal; a communication medium, such as fiber optic cable and coaxial cable, coupled to the head end section for routing the cable signal through the cable television system, and cable taps coupled to the communication medium for receiving the cable signal and providing subscriber drops to subscribers of the cable television system. As the cable signal is routed through the system, the signal levels of the signal decrease, and higher frequencies are attenuated more rapidly than are lower frequencies of the signal. Therefore, taps of the cable television system include equalizer circuits for attenuating lower frequencies of the cable signal to advantageously provide relatively flat signal levels at the subscriber drops and to provide relatively equivalent reverse path levels at the headend section. Conventional cable taps, on the other hand, provide signals that mimic the signal levels of the incoming signals. In other words, if, in conventional systems, the higher frequencies of the incoming signals are greatly attenuated in comparison with the lower frequencies, the subscriber equipment sees this same disparity, which can result in signal processing errors.

What is claimed is:

1. A tap for use in a cable television system, the tap comprising an input for receiving a forward cable signal and for transmitting a reverse cable signal;

an equalizer circuit coupled to the input for attenuating lower frequencies of the forward cable signal and the reverse cable signal; and at least one output for providing the forward cable signal after processing by the equalizer circuit and for receiving the reverse cable signal from equipment to which the tap is coupled.

2. The tap of claim 1, further comprising:

a directional coupler coupled to the input of the tap for receiving the forward cable signal, the directional coupler having an output for providing the forward cable signal to the equalizer circuit and a main output for providing the forward cable signal for processing by other cable equipment.

3. The tap of claim 1, wherein the at least one output comprises a plurality of subscriber outputs.

4. The tap of claim 1, wherein the equalizer circuit comprises a high pass filter.

5. A tap for use in a cable television system, the tap comprising:

a tap input for receiving a forward cable signal and for transmitting a reverse cable signal;

a directional coupler coupled to the tap input and having a main output for providing the forward cable signal to other cable equipment and an equalizer output;

an equalizer circuit coupled to the equalizer output for attenuating lower frequencies of the forward cable signal and the reverse cable signal; and subscriber outputs coupled to an output of the equalizer circuit for providing output signals, lower frequencies of which have been attenuated by the equalizer circuit and for receiving and providing reverse cable signals from subscribers to the equalizer output for subsequent processing by the equalizer circuit.

6. The tap of claim 5, wherein the equalizer circuit comprises a high pass filter.

7. A cable television system, comprising:

a head end section for generating a forward cable signal;

a communication medium coupled to the head end section for routing the forward cable signal through the cable television system to subscriber equipment and for routing a reverse cable signal from the subscriber equipment to the head end section, wherein higher frequencies of the forward cable signal and the reverse cable signal are attenuated as the cable signal is routed; and a tap coupled to the communication medium for receiving, at an input, the forward cable signal and for transmitting, at the input, the reverse cable signal, for attenuating lower frequencies of the forward cable signal and the reverse cable signal, for providing, at an output, at least one output signal, the lower frequencies of which have been attenuated by the tap, and for receiving, at the output, the reverse cable signal, which is attenuated by the tap prior to transmission over the communication medium to the head end section.

8. The cable television system of claim 7, wherein the tap comprises:

an equalizer circuit for attenuating the lower frequencies of the forward cable signal and the reverse cable signal.

9. The cable television system of claim 8, wherein the tap further comprises:

a directional coupler having an input coupled to the communication medium, a main output for forwarding the forward cable signal through the cable television system, and an equalizer output for providing the forward cable signal to the equalizer circuit.

10. The cable television system of claim 9, wherein the equalizer circuit comprises a high pass filter.

11. The cable television system of claim 9, wherein the tap further comprises a plurality of subscriber outputs for providing the forward cable signal after processing by the equalizer circuit.

12. The cable television system of claim 11, further comprising:

amplifiers situated along the communication medium for amplifying the forward cable signal.

13. The tap of claim 1, wherein the reverse cable signal is within a frequency range of about 5 to 40 MHz, and wherein all frequencies of the reverse cable signal are attenuated by the equalizer circuit prior to the reverse cable signal being provided at the input for further transmission upstream in the cable television system.

14. The tap of claim 5, wherein the reverse cable signal is within a frequency range of about 5 to 40 MHz, and wherein all frequencies of the reverse cable signal are attenuated by the equalizer circuit prior to transmission of the reverse cable signal by the tap input.

15. The tap of claim 14, wherein the reverse cable signal is received by the tap via the subscriber outputs and is transmitted, after attenuation, upstream within the cable television system via the tap input.

16. The cable television system of claim 7, wherein the reverse cable signal is within a frequency range of about 5 to 40 MHz and is originated by subscriber equipment coupled to the output of the tap.

17. The cable television system of claim 16, wherein all frequencies of the reverse cable signal are attenuated by the tap prior to transmission of the reverse cable signal, via the input of the tap, upstream within the cable television system.

* * * * *